United States Patent
Garbagnati et al.

(10) Patent No.: US 10,604,346 B2
(45) Date of Patent: Mar. 31, 2020

(54) MODULE FOR A MODULAR CONVEYOR BELT WITH A ROLLER CONVEYOR SURFACE AND MODULAR CONVEYOR BELT FORMED BY A PLURALITY OF SUCH MODULES

(71) Applicant: REGINA CATENE CALIBRATE S.p.A., Milan (IT)

(72) Inventors: Carlo Garbagnati, Cernusco Lombardone (IT); Norberto Cattaneo, Cernusco Lombardone (IT)

(73) Assignee: REGINA CATENE CALIBRATE S.p.A., Milan (IT)

( * ) Notice: Subject to any disclaimer, the term of this patent is extended or adjusted under 35 U.S.C. 154(b) by 82 days.

(21) Appl. No.: 15/760,820

(22) PCT Filed: Sep. 27, 2016

(86) PCT No.: PCT/IB2016/055775
§ 371 (c)(1),
(2) Date: Mar. 16, 2018

(87) PCT Pub. No.: WO2017/055999
PCT Pub. Date: Apr. 6, 2017

(65) Prior Publication Data
US 2019/0283969 A1 Sep. 19, 2019

(30) Foreign Application Priority Data
Sep. 28, 2015 (IT) .................. 102015000055890

(51) Int. Cl.
*B65G 17/40* (2006.01)
*B65G 17/24* (2006.01)

(52) U.S. Cl.
CPC .............. *B65G 17/40* (2013.01); *B65G 17/24* (2013.01); *B65G 2207/30* (2013.01)

(58) Field of Classification Search
CPC ..... B65G 17/40; B65G 2207/30; B65G 17/24
(Continued)

(56) References Cited

U.S. PATENT DOCUMENTS 1,852,942 A    4/1932  Streine
3,237,755 A *  3/1966  Weihe, Jr. ............. A47L 15/248
                                                    198/779

(Continued)

FOREIGN PATENT DOCUMENTS

NL        1 010 530 C2    5/2000
WO    2013/030404 A1    3/2013

OTHER PUBLICATIONS

International Search Report dated Mar. 22, 2017 in PCT/IB2016/055775 filed Sep. 27, 2016.

*Primary Examiner* — Mark A Deuble
(74) *Attorney, Agent, or Firm* — Oblon, McClelland, Maier & Neustadt, L.L.P.

(57) ABSTRACT

A module is for a modular conveyor belt having a roller conveyor surface. The module includes a base body including a first end and an opposite second end along a feeding direction of the belt and at each of which an articulation eye is defined for a cylindrical hinge articulation respectively with a second end and with a first end of adjacent modules. The base body also includes a first surface from which supports project for supporting at least one shaft on which at least one roller is mounted. A distance between the articulation axis defined by each of the cylindrical hinges and an orthogonal projection of a longitudinal axis of the at least one shaft on a reference plane is not null and is less than a sum of a radius of the at least one roller and of half the height L of the respective articulation eye.

17 Claims, 6 Drawing Sheets

(58) Field of Classification Search
USPC .......................................................... 198/779
See application file for complete search history.

(56) References Cited

U.S. PATENT DOCUMENTS

| | | | | |
|---|---|---|---|---|
| 6,029,802 | A * | 2/2000 | Musiari | B65G 17/08 198/779 |
| 6,148,990 | A * | 11/2000 | Lapeyre | B65G 17/08 198/779 |
| 7,216,759 | B2 * | 5/2007 | Rau | B65G 17/08 198/779 |
| 7,556,136 | B2 * | 7/2009 | Marshall | B65G 17/24 198/370.09 |
| 8,225,922 | B1 * | 7/2012 | Fourney | B65G 17/24 198/370.09 |
| 8,622,202 | B2 * | 1/2014 | Rau | B65G 17/24 198/779 |
| 8,678,180 | B2 * | 3/2014 | Marshall | B65G 17/24 198/779 |
| 9,010,523 | B2 * | 4/2015 | Fourney | B65G 13/00 198/779 |
| 2007/0034484 | A1 * | 2/2007 | Fandella | B65G 17/08 198/851 |
| 2009/0266682 | A1 * | 10/2009 | Elsner | B65G 17/086 198/779 |
| 2014/0346014 | A1 * | 11/2014 | Andreoli | B65G 13/02 198/779 |

* cited by examiner

MODULE FOR A MODULAR CONVEYOR BELT WITH A ROLLER CONVEYOR SURFACE AND MODULAR CONVEYOR BELT FORMED BY A PLURALITY OF SUCH MODULES

BACKGROUND

The present invention relates to a module for a modular conveyor belt with a roller conveyor surface and to a modular conveyor belt formed by a plurality of such modules.

Conveyor belts are known in the conveyor belts field, which are formed by a plurality of modules hinged to one another and the conveyor surface of which is defined by a plurality of rollers mounted on the modules themselves.

In particular, modules are known consisting of a base body that, at a front end and at a rear end with respect to the feeding direction of the belt is provided with one or more eyes, which receive pins for articulating with adjacent modules.

One or more coupling spaces are obtained in the base body for coupling with the gear teeth for driving the belt; as known, said spaces are accessible from the lower surface of the base body, namely from the surface opposite the one equipped with rollers.

From the upper surface of the base body supports protrude for supporting one or more shafts, on each of which a plurality of rollers adjacent to one another is mounted in a rotatable manner so as to form a row that extends substantially by the entire width of the module, except for the thickness of the supports. The conveyor surface of the belt is defined by the plane tangent to the outer lateral surface of the rollers. The upper surface of the modules is generally flat and between it and the lower directrix of the rollers a clearance exists such as to avoid, in use, jamming of the rollers following bending of the respective shaft due to the load acting thereonto.

Modules of the above-mentioned type are described, for example, in WO2014/066607-A1, AU-B-64692/86-B2 or NL1010530-C2 patent.

Modules of this type have the advantage of offering an almost continuous conveyor surface formed by the succession of rows of rollers. However, such modules have the drawback of having high sizes, in particular the height and weight, which penalise the conditions of use of the belts formed with them.

In particular, modules of this type have a high total height given by the sum of the thickness of the base body, the diameter of the rollers and the clearance existing between the rollers and the upper surface of the module itself. As known to the skilled person, this total height is directly correlated to the so-called "chordal effect" of opening and separating modules at the winding of the belt around the driving gear. Such a "chordal effect" is undesired since it causes problems of continuity of the conveyor surface at the fittings with the so-called "passage idle plates" arranged at the ends of the belt, as well as problems of safety of use, since, for example, the possibility exists that the operators may accidentally injure themselves.

Moreover, the total weight of these modules penalises the conditions of use of the belt, limiting, on the one hand, the load capacity and, on the other hand, encumbering the tensile stress status needed to be applied to the belt in order to draw it in motion.

Therefore the need has been felt for a long time to provide modules for modular conveyor belts with a roller conveyor surface which have overall a reduced total height and a lower weight compared with known modules, but substantially equal or slightly reduced mechanical strength characteristics.

In this respect, it has to be noted that, as known to the skilled person, in order to reduce the total height of the known modules, it is not possible to reduce at will the diameter of the rollers. On the one hand, in fact, the shaft on which the rollers are mounted must have a diameter such as to limit possible bending under load and that, therefore, must be greater than a defined lower limit. Moreover, on the other hand, in order to guarantee that a rotatable coupling is maintained between rollers and respective supporting shaft also under load, the ratio between the diameter of the shaft and that of the rollers must not be less than a defined lower limit.

In order to reduce the formation of separation openings between successive modules (i.e. the "chordal effect") and, therefore, to limit the risk of crushing of operators intervening manually on the conveyor, US2013/0319824-A1 patent proposes to form at both opposite ends of each module of deflector elements that protrude from the upper surface of the module itself. According to what US2013/0319824-A1 patent describes, these deflector elements are hook shaped with a convex upper surface and extend above the cylindrical eyes for articulating with successive modules, without, however, protruding beyond the conveyor surface defined by the rollers. The deflector elements of successive modules interlock with one another so as to reduce the openings that separate the rollers of those modules, in particular at the sections in which the module articulates around the driving gear.

In order to reduce the total height and the weight of the roller modules of the known type and as described above, modules have been proposed, in the thickness of which the rollers have been incorporated. In these known modules the rollers are mounted coaxially to the pin that articulates successive modules; in practice, the rollers are housed in seats obtained in certain articulation eyes. The rollers of each module are, therefore, spaced by portions of module at which the spaces for coupling with the driving gear teeth are obtained.

Even these known modules have, however, some drawbacks. A first drawback is represented by the fact that the rollers are inevitably spaced from one another, so that it is impossible to obtain an almost continuous conveyor surface. The spacing of the rollers is due, on the one hand, to the impossibility of arranging the rollers at the portions of module in which the spaces for coupling with the driving gear teeth are obtained and, on the other hand, by the need of not excessively reducing the mechanical strength of the modules themselves.

A further drawback, in fact, is represented by the fact that these modules have poorer mechanical characteristics with respect to corresponding modules without rollers or with rollers supported above respective base bodies, the resistant section thereof being reduced by the containment seats of the rollers themselves.

WO2013/030404-A1 describes a module of a chain or of a roller belt wherein the rollers are incorporated in the body of the module itself in such a way that a lower portion of the rollers intersects the plane tangent to the upper surface of the hinge pins; therefore the rollers partially overlap the hinge pins along a direction orthogonal to the conveyor surface.

For this purpose, WO2013/030404-A1 teaches to form the module with a number of articulation eyes reduced and distributed differently with respect to the known modules. In particular, still according to WO2013/030404-A1, between articulation eyes that are successive and protruding from a same end of each module an empty space remains defined, which defines an area for housing at least one respective roller and at which the hinge pin that articulates the module to a successive module remains uncovered. Therefore, considering two successive modules articulated to one another, the respective rollers directly face the portion of the hinge pins adjacent to them, namely the outer lateral surface of the rollers directly faces the outer lateral surface of the portion of the hinge pins that extends at the respective housing area. According to WO2013/030404-A1, this allows reducing the distance between the outer lateral surfaces of the rollers and of the hinge pins to minimum values and, therefore, the overall height of the modules and the relative "chordal effect".

However, such a configuration of the modules involves a reduction in the mechanical strength of the modular chain or belt under shear stress.

BRIEF SUMMARY

The aim of this invention is therefore to make a module for a modular conveyor belt with a roller conveyor surface and in a modular conveyor belt made of a plurality of said modules which overcome the drawbacks of the prior art.

Within this general aim, a particular aim of the present invention is to provide a module for a modular conveyor belt with a roller conveyor surface that has reduced total height and weight and high mechanical strength characteristics.

Another aim of the present invention is to make a module for a modular conveyor belt with a roller conveyor surface that allows obtaining conveyor belts having a substantially continuous conveyor surface.

Another aim of the present invention is to make a module for a modular conveyor belt with a roller conveyor surface and a modular that are particularly simple, functional and cost-effective.

These aims according to the present invention are achieved by making a module for a modular conveyor belt with a roller conveyor surface and a modular conveyor belt.

BRIEF DESCRIPTION OF THE DRAWINGS

The features and advantages of a module for a modular conveyor belt with a roller conveyor surface and of a modular conveyor belt made of a plurality of modules according to the present invention will become clearer from the following description, given as a non-limiting example, referred to the enclosed schematic drawings in which.

DETAILED DESCRIPTION

Figure 1:
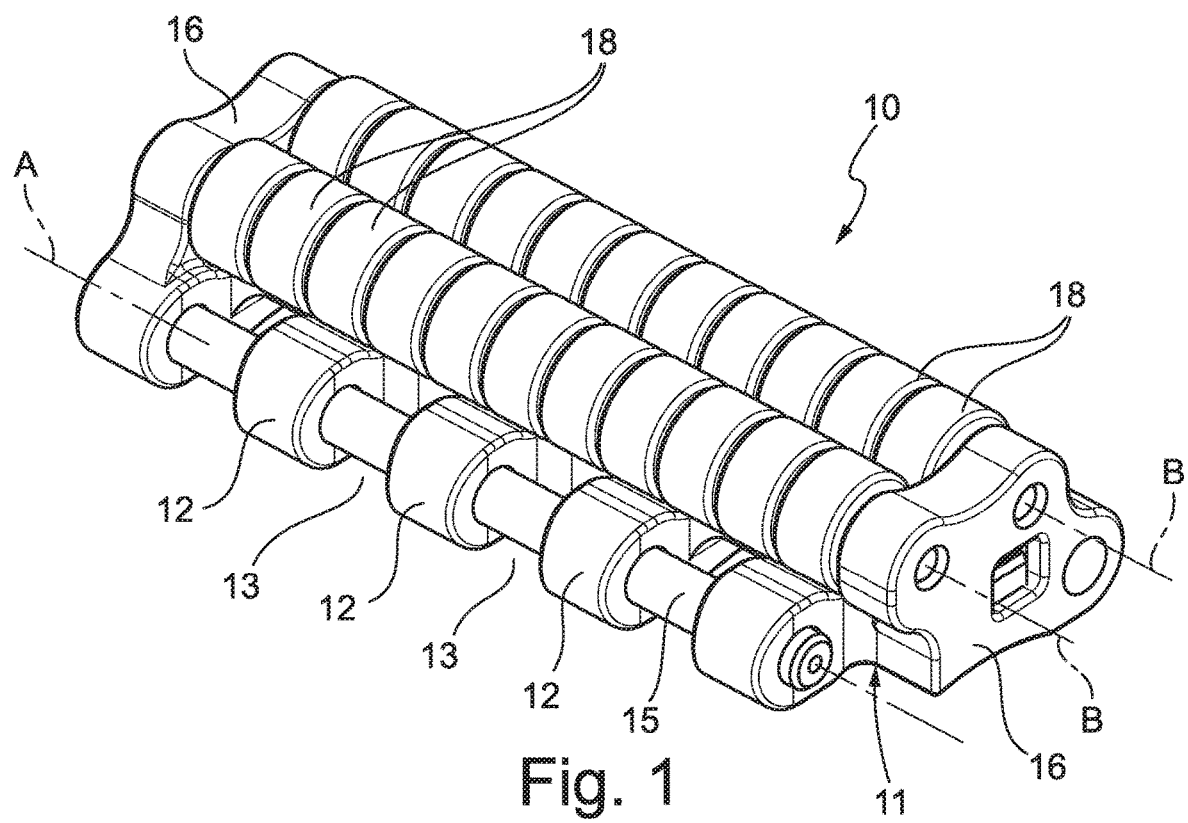
FIG. 1 is an axonometric view of a module according to the present invention.
Figure 2:
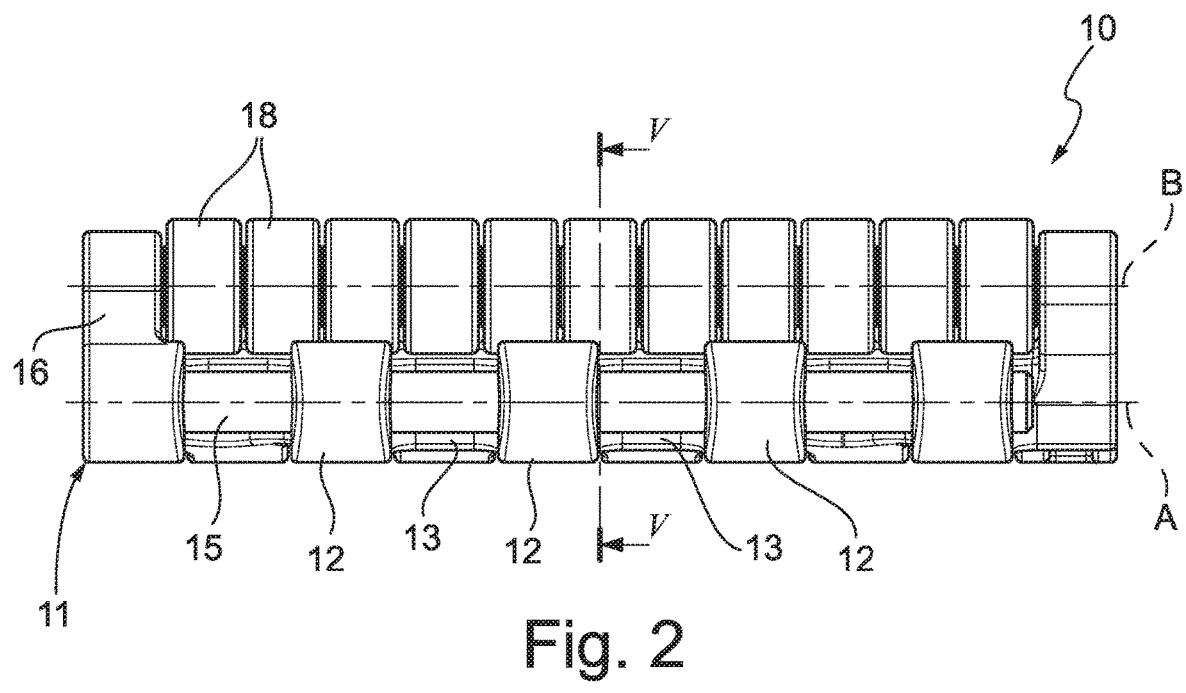
FIGS. 2, 3 and 4 show the module of FIG. 1 in a front view, a top plan view and a bottom plan view, respectively.
Figure 3:
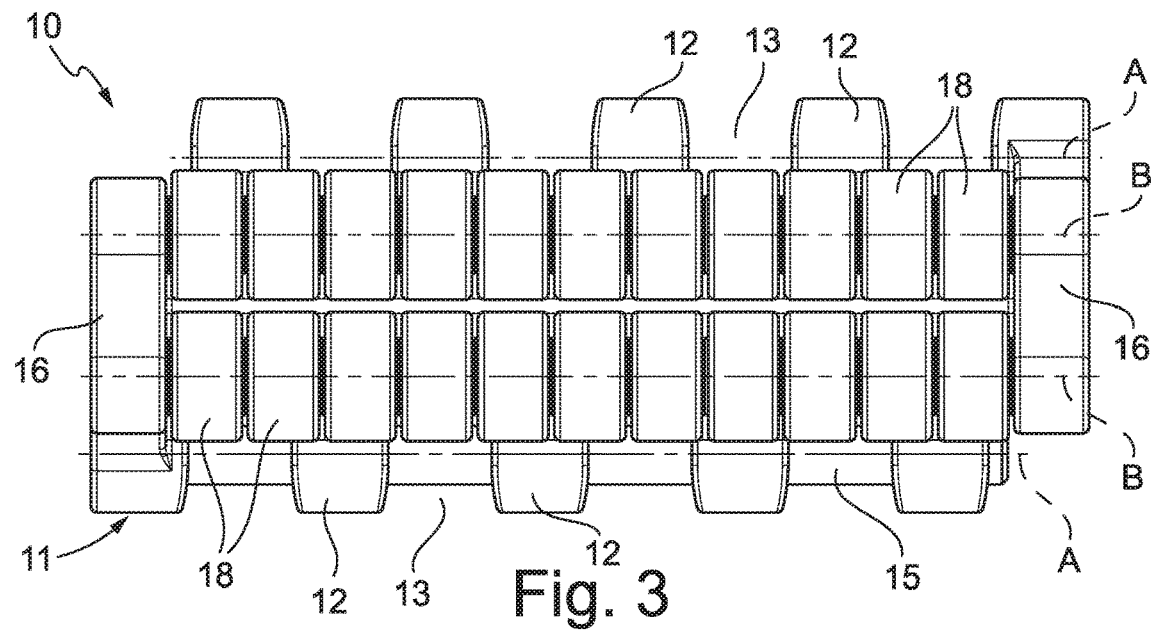
Figure 4:
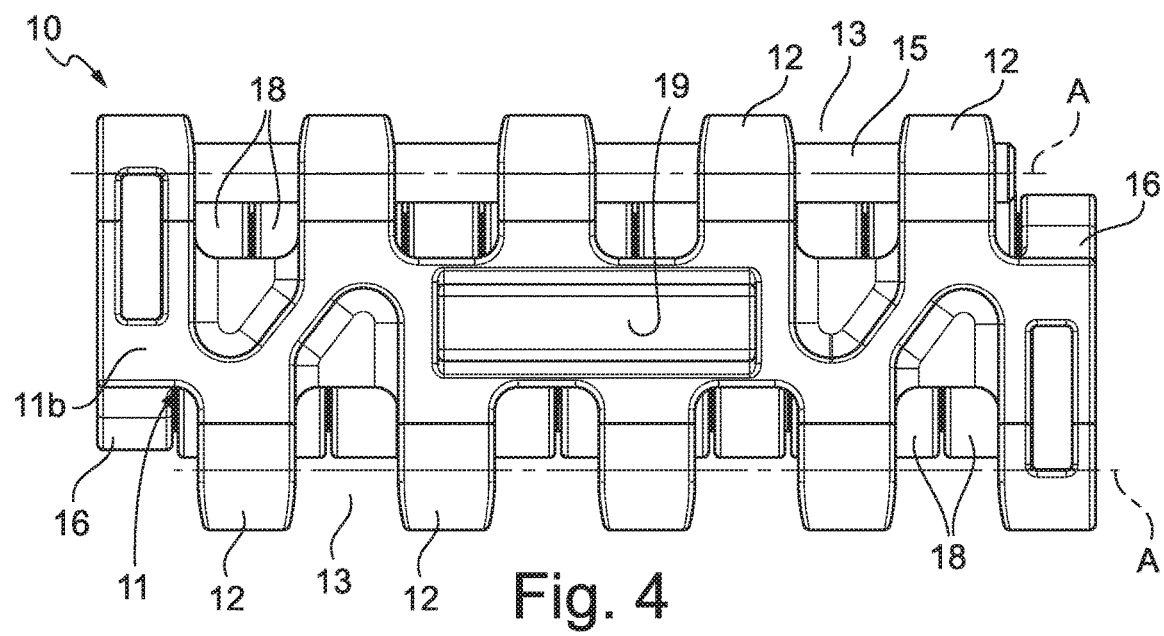
Figure 5:
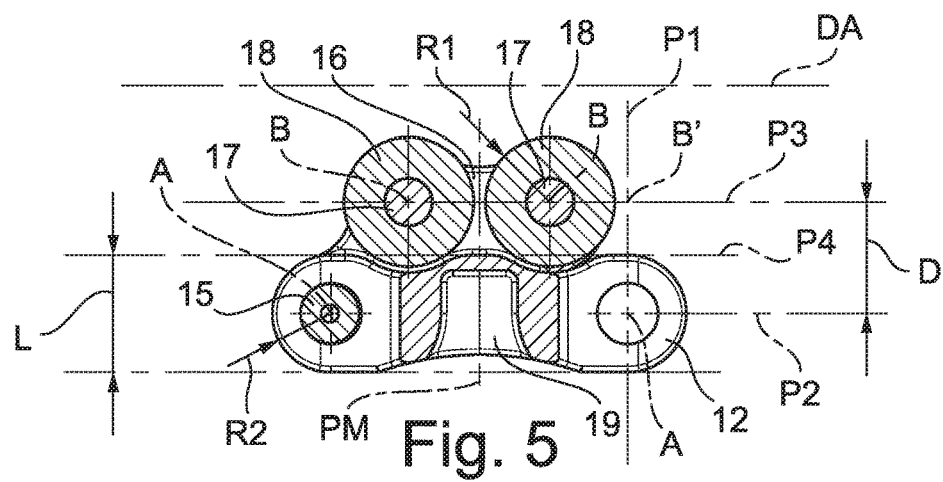
FIG. 5 is a cross-section according to the plane V-V of FIG. 2.
Figure 6:
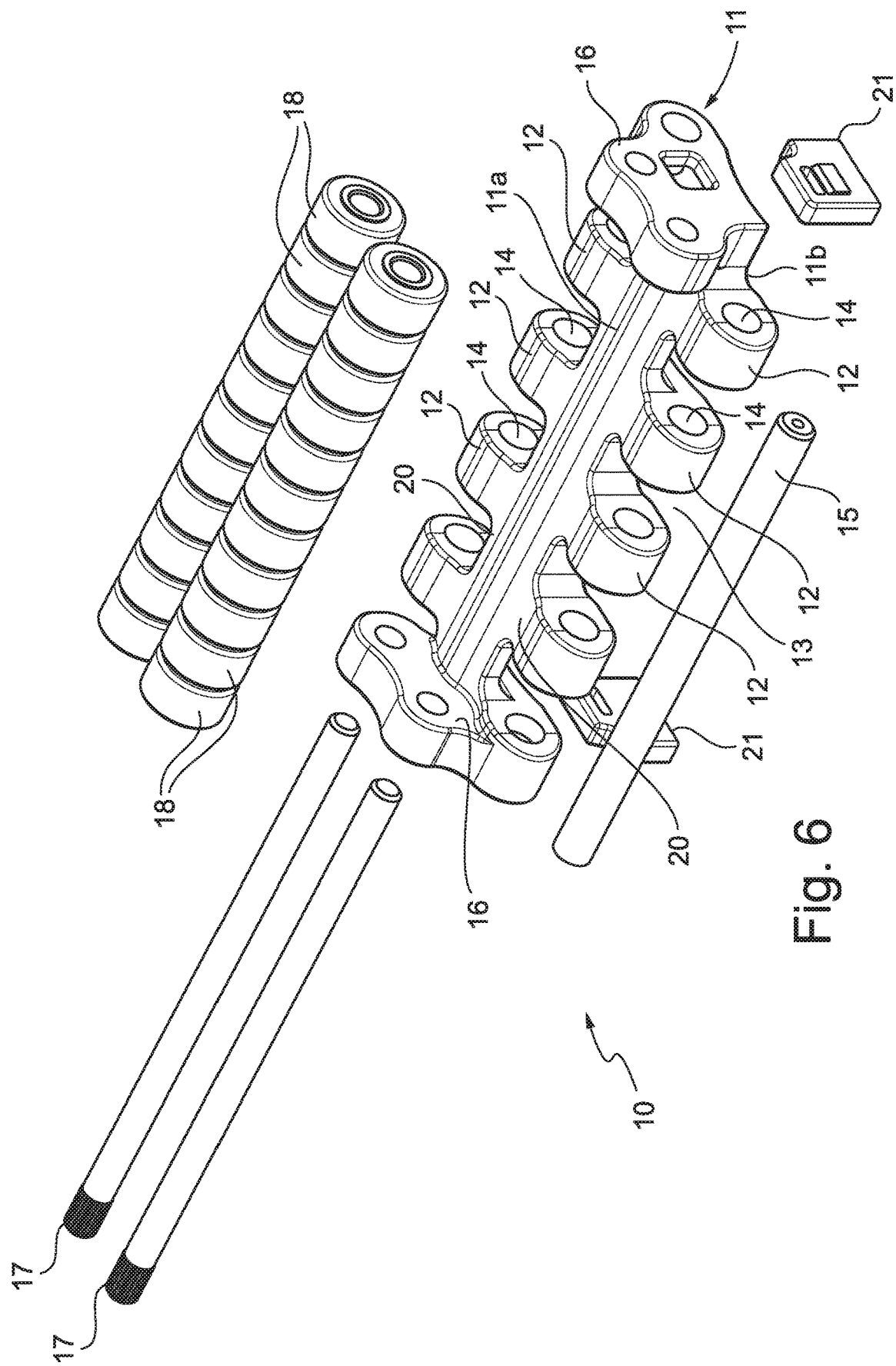
FIG. 6 is an exploded axonometric view of the module of FIG. 1.
Figure 7:
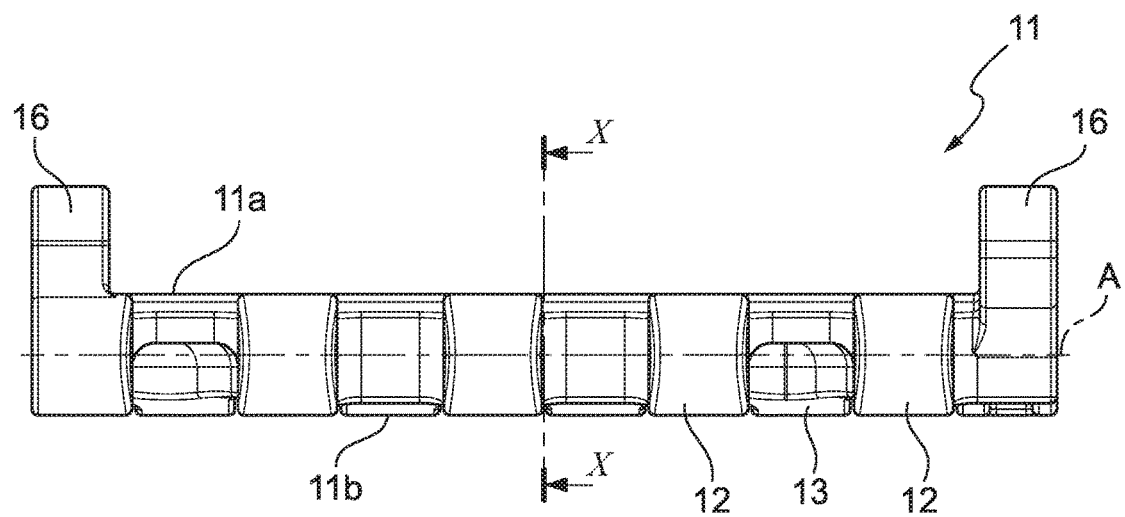
FIGS. 7, 8 and 9 show the base body of the module of FIG. 1 in a front view, a top plan view and a bottom plan view, respectively.
Figure 8:
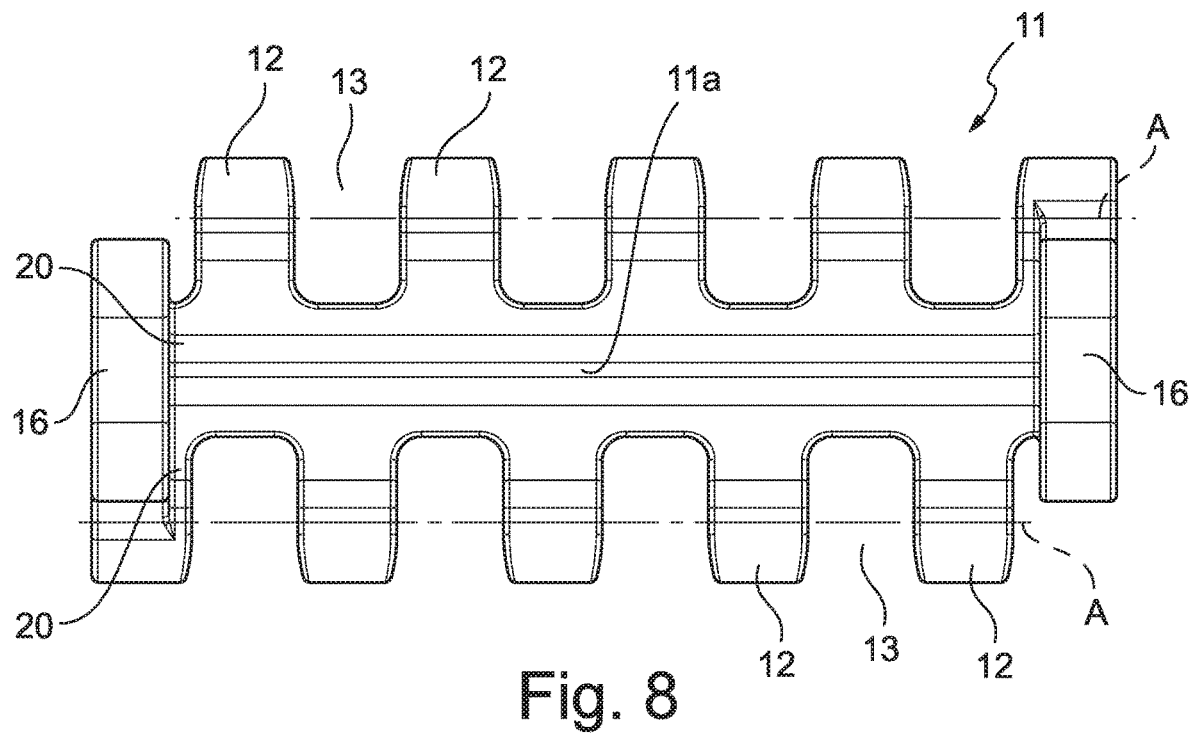
Figure 9:
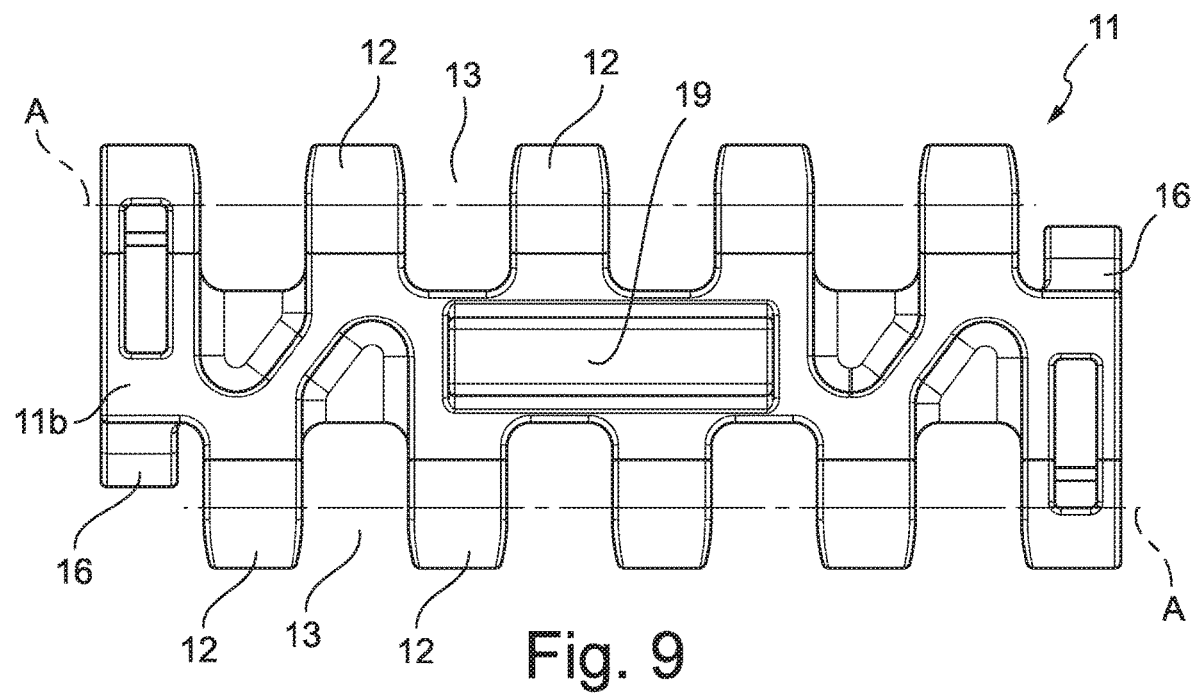
Figure 10:
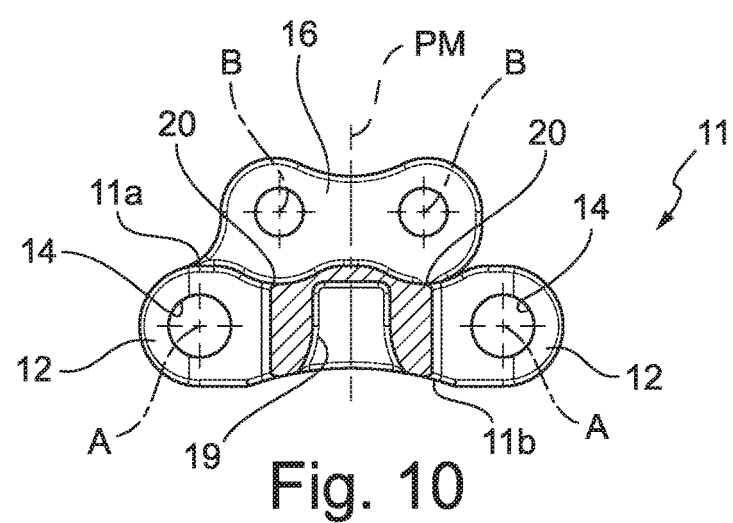
FIG. 10 is a cross-section according to the plane X-X of FIG. 7.

With reference to the enclosed figures, numeral 10 wholly indicates a module of a modular conveyor belt of the type with a roller conveyor surface.

It is noted that adjectives such as "first" and "second" in the present description only have the purpose of clarity of exposition and must not be intended in a limiting sense.

Moreover, in the present description, adjectives such as "front" and "rear", "upper" and "lower" refer to the usual conditions of use of the module 10 to form a conveyor belt 100 of the endless type drawn in motion by a pair of gears and forming an upper branch for conveying products and a lower return branch.

The module 10 is used to make belts 100 that, for example, are used for conveying bottles, cans or boxes, either singular or grouped.

The module 10 comprises a base body 11 that has a first end and a second end, which are opposite one another other along the feeding direction of the belt 100 and at each of which at least one articulation eye 12 is defined for the cylindrical hinge articulation, respectively, with the second end and with the first end of adjacent modules 10.

"Feeding direction", indicated in the enclosed figures by line DA, means the direction along which the belt 100 is driven and which is parallel to the plane defined by the upper branch of the belt 100 and to the development in length thereof.

The first end and the second end of the base body 11 are opposite one another with respect to the feeding direction DA and, also considering the feeding direction of the belt 100, one of them is front and the other is rear.

In a preferred embodiment, a respective plurality of eyes 12 spaced from one another is defined at the first end and at the second end so that between successive eyes 12 empty spaces 13 remain defined for housing eyes 12 of adjacent modules 10. The eyes 12 and the empty spaces 13 intercalate at the first end and at the second end along the entire width of each module 10, each space 13 housing a respective eye 12 of an adjacent module; the term "width" meaning the extension of the module 10 along a direction parallel to the conveyor surface and orthogonal to the feeding direction DA.

Each eye 12 is crossed by a hole 14 or by a slot, into which a pin 15 inserts for articulating with the adjacent module. The longitudinal axis of the pin 15 defines the articulation axis A of two successive modules 10.

The articulation axes A of the cylindrical hinges defined at the first end and at the second end of the base body 11 are parallel to one another, coplanar and orthogonal to the feeding direction DA.

The distance between the articulation axes A of the cylindrical hinges defined at the first end and at the second end of the base body 11 defines the pitch of the belt 100.

The eyes 12 obtained at the first end and the second end of the base body 11 are substantially equal to one another; in particular, each of them has overall a height L measured at a reference plane P1 orthogonal to the feeding direction DA and containing the respective articulation axis A.

The base body 11 has then a first surface 11a and a second surface 11b that are opposite one another.

The first surface 11a faces towards the conveyor surface of the belt 100; it is also noted that the first surface 11a extends the entire base body 11, including the eyes 12.

In practice, the first surface 11a is the upper surface of the module 10.

Supports 16 protrude from the first surface 11a for supporting at least one shaft 17 whereon at least one roller 18 is mounted in a rotating manner.

As clearly evident in the enclosed figures, the at least one shaft 17 and the at least one respective roller 18 are supported above the first surface 11a.

The supports 16 protrude from the first surface 11a from the opposite side with respect to the second surface 11b.

In a preferred embodiment, the supports 16 support the axially opposite ends the shaft 17. For example, the supports 16 are made of edge walls obtained at the opposite sides of the base body 11; the distance between the outer lateral surfaces of said two lateral edges defines the width of the module 10.

The shaft 17 has a longitudinal axis B parallel to the articulation axes A.

Preferably, a plurality of rollers 18 adjacent to one another is mounted on the shaft 17 to form a continuous row that extends between the supports 16. In a preferred embodiment, the row of rollers 18 extends substantially by the entire width of the module 10 except for the thickness of the supports 16.

Each roller 18 has radius R1.

In a preferred embodiment, the supports 16 are configured to support a pair of shafts 17, on each of which at least one respective roller 18 is mounted, in which the shafts 17 are parallel and coplanar to one another and the rollers 18 are equal to one another or have at least equal radius R1.

As known to the skilled person, the conveyor surface of the belt 100 is defined by a plane tangent to the outer lateral surface of the rollers 18 and parallel to the feeding direction DA.

Figure 11:
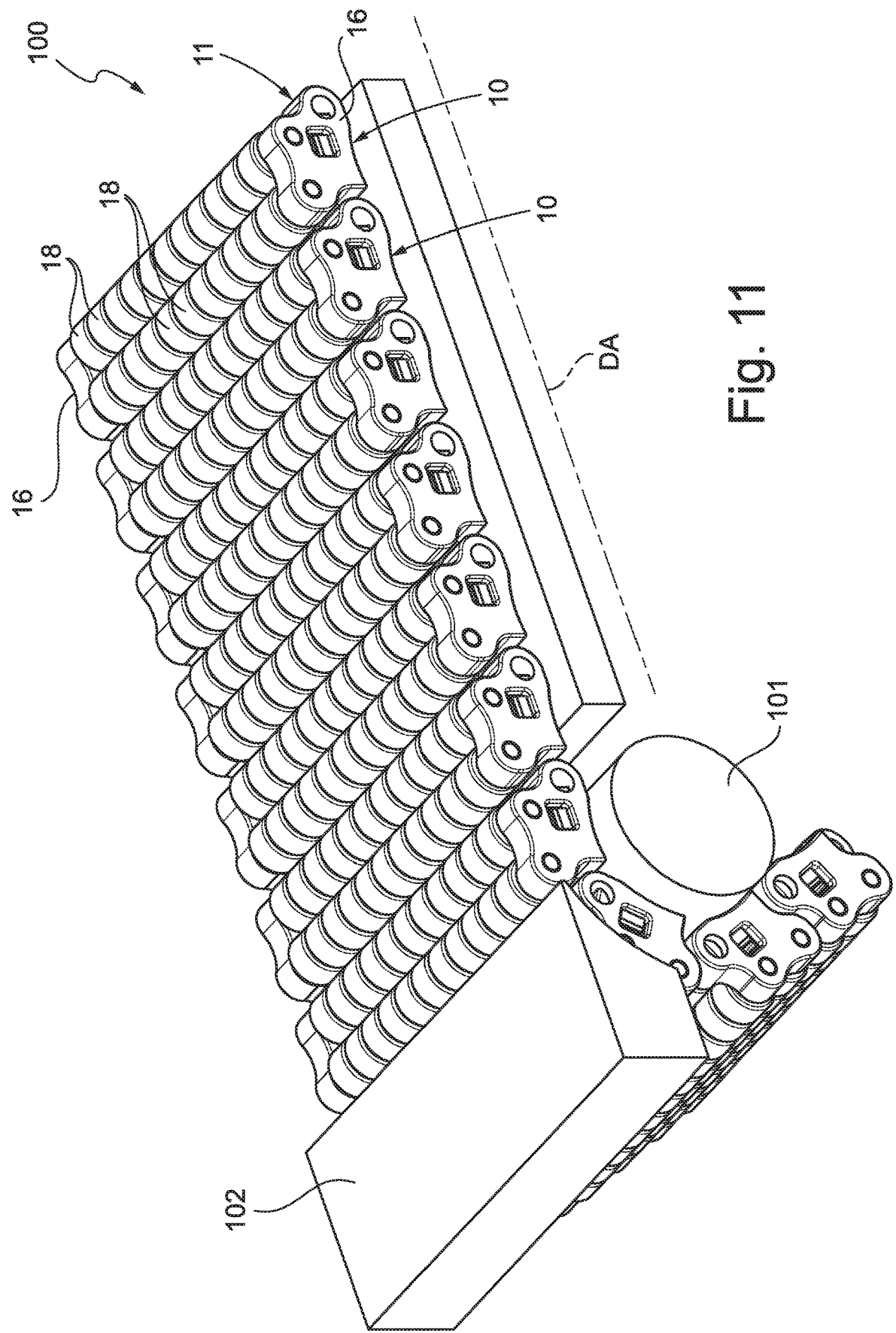
FIG. 11 shows in axonometry a portion of a modular conveyor belt according to the present invention.

The second surface 11b defines the lower surface of the belt 100 and at it the access end of at least one coupling space 19 is defined, said coupling space (19) being obtained in the base body 11 for coupling with at least one tooth of a drive gear 101 of the belt 100. FIG. 11 only schematically shows one of the two driving gear 101.

According to a feature of the present invention, the distance D between each of the articulation axes A and the orthogonal projection B' of the longitudinal axis B of the shaft 17 on the reference plane P1 is not null (i.e. is greater than zero) and is less than the sum of the radius R1 of the rollers 18 and of half the height L of the respective eye 12:

$$0 < D \leq R1 + L/2$$

In other words, considering plane P2, which contains the articulation axes A of the cylindrical hinges defined at the first end and at the second end of the base body 11, and plane P3, which is parallel to plane P2 and which contains the longitudinal axis B of the shaft 17, the distance D between said two planes P2 and P3 is not null and is less than the sum of the radius R1 of the rollers 18 and of half the height L of the eyes 12.

Moreover, generally, each eye 12 is formed by a half-cylindrical portion of curvature radius R2 and the height L thereof is equal to twice said radius R2 (L=2×R2), so that the distance D is not null and is less than the sum of the radius R1 of the rollers 18 and of the radius of curvature R2 of the eye 12 ($0 < D \leq R1 + R2$).

Basically, according to the present invention, the rollers 18 are partially, but not completely, "interpenetrating" or "embedded" in the base body 11.

For this purpose, the first surface 11a of the base body 11 has a recess 20 in which a portion of the rollers 18 is housed with a defined clearance. The recess 20 may be formed, at least partially, by a shaping, a lowing or the like of the first surface 11a.

In particular, each recess 20 is shaped to house a cylindrical sector of the rollers 18. "Cylindrical sector" means to indicate the portion of each roller 18, which faces towards the first surface 11a and intercepted by the plane P4 parallel to the plane P2 and tangent to the outer lateral surface of the eyes 12 at the plane P1.

The recess 20 receives the rollers 18 with a defined clearance in such a way as to leave their rotation free even under load and also following possible bending of the respective shaft 17, thus avoiding possible jamming. Such a clearance is, preferably, of 1 mm. Between the outer lateral surface of the rollers 18 and the recess 20 there is namely an empty space that leaves the former free to rotate with respect to the latter.

The recess 20, seen in cross section according to a plane orthogonal to the articulation axes A and to the longitudinal axis B has, for at least one section, an arched profile, advantageously as an arc of a circle and, even more advantageously, as an arc of a circle with the centre on the longitudinal axis B of the respective shaft 17.

The recess 20 extends along a portion of the first surface 11a that extends parallel to the respective shaft 17 by a length greater than the height of the respective at least one roller 18. In case the shaft 17 supports a row of rollers 18, the recess 20 extends along a portion of the first surface 11a that extends parallel to the respective shaft 17 by a length greater than the length of the row. Advantageously, the recess extends along a portion of the first surface 11a that extends parallel to the respective shaft 17 by a length equal to the distance between the respective supports 16, namely, the distance between the mutually facing surfaces of the supports 16.

In a preferred embodiment shown in the enclosed figures, each module 10 has a pair of shafts 17 arranged with the respective longitudinal axes B parallel to one another and coplanar. Each shaft 17 supports a plurality of rollers 18 equal to one another and arranged adjacent to one another to form a continuous row that extends substantially by the entire width of the module 10.

The two shafts 17 can be arranged symmetrically with respect to a median plane PM of the module 10 itself and, in particular, of the space 19. Advantageously, the space 19 is obtained in a central position with respect to the articulation axes A defined at the first end and at the second end of the base body 11. Even more preferably, the space 19 is obtained in a central position even with respect to the opposite sides of the base body 11. In that case, the distance D is such as to reduce the thickness of the wall of the base body 11 which delimits the bottom of the space 19 without adversely affecting the structural continuity of the base body 11 itself.

In that case, advantageously, the base body 11 has, for each shaft 17 on which rollers 18 are mounted, a respective recess 20 as defined above.

With particular reference to the embodiment shown in the enclosed figures, it is also noted that, at the empty spaces 13, the recess 20 is "discontinuous"; it consists, in fact, of one section of a shaping of the first surface 11a and for one section of a portion of the free space 13 that remains free following the coupling with the respective eye 12 of an adjacent module 10. On the contrary, at each eye 12, the recess 20 consists of a shaping of the first surface 11a that partially also extends on the eye 12 itself.

The arrangement of the shafts 17, the degree of "interpenetration" of the rollers 18 in the base body 11, the height L of the eyes 12, that is, the thickness of the base body 11 that defines the resistant section of the module, are shaped in such a way as to be able to contain the overall height of the module 10 without, however adversely affecting the mechanical strength. As known to the skilled person, the resistant section of the module 10 is defined at the reference plane P1.

In a preferred embodiment, the height L is of 10 mm, the radius R1 of the rollers 18 is equal to 5.5 mm and the distance D is equal to 9.5 mm. Even more preferably, each shaft 17 has a diameter equal to 4 mm.

For the sake of completeness of description, it is noted that in the enclosed figures numeral 21 indicates elements for locking the ends of the shafts 17 in the respective supports 16.

FIG. 11 schematically shows a portion of a belt 100 formed by a plurality of modules 10 articulated to one another to form a closed loop wound on a pair of drive gears 101, only one of which is schematically shown. Numeral 102 indicates a plate arranged at an end of the belt 100 for the passage from or on it of the products to be transported.

The assembly and operation of the module and of the modular conveyor belt according to the present invention are immediately comprehensible to the skilled person in light of the above description and the enclosed figures.

Thanks to the arrangement of the rollers that are only partially "interpenetrating" or "embedded" in the base body, it is possible to form a substantially continuous roller conveyor surface, at the same time limiting the overall height of the module and without adversely affecting the mechanical strength of the module itself.

The reduction in the overall height of the module allows limiting the so-called "chordal effect" of separation of the modules at the winding of the belt around the driving gear.

The particular shape of the base body and, in particular, its shaping and its thickness (height), which is generally less than that of the known modules, allows reducing the overall weight of the module by approximately 20%-30%. The reduction of the overall weight allows conveying, under the same conditions of driving the belt, greater loads or, under the same load conditions, reducing the stress status that has to be applied to the belt in order to drive it. This allows, on the one hand, reducing the power necessary to drive the belt or, on the other hand, increasing the interaxis between the driving gears.

The modular conveyor belt module with a roller conveyor surface and the modular conveyor belt thus conceived can undergo numerous modifications and variants, all falling within the scope of protection of the invention; moreover, all of the details can be replaced by technically equivalent elements. In practice, the materials used, as well as the sizes, can be whatever according to the technical requirements.

The invention claimed is:

1. A module of a modular conveyor belt having a roller conveyor surface, said module comprising:
    a base body including:
        a first end and a second end that are opposite one another along a feeding direction of said belt and at each of which at least one articulation eye is defined for a cylindrical hinge articulation respectively with a second end and with a first end of adjacent modules, wherein an articulation axis defined by each of said cylindrical hinges is orthogonal to the feeding direction of said belt and wherein each of said articulation eyes has a height L measured at a reference plane orthogonal to said feeding direction of said belt and containing the respective said articulation axis, and
        a first surface from which supports project for supporting at least one shaft on which at least one roller is mounted, wherein the conveyor surface of said belt is defined by a plane tangent to the outer lateral surface of said at least one roller and parallel to said feeding direction,
    wherein a distance between each of said articulation axes and an orthogonal projection of a longitudinal axis of said at least one shaft on said reference plane is not null and is less than a sum of a radius of said at least one roller and of half said height of the respective said articulation eye,
    wherein said first surface defines an upper surface of the belt and extends over the whole base body, which includes between lateral edges of the base body and between said articulation eyes and the first and second end of the base body, and has at least one recess for housing with clearance a portion of said at least one roller mounted on said at least one shaft, and
    wherein said recess is formed, at least partially, by a shaping or lowering of said first surface, said recess partially also extending on said eyes.

2. The module according to claim 1, wherein said portion of said at least one roller is a cylindrical sector of said at least one roller.

3. The module according to claim 1, wherein said at least one recess has at least one section having an arched profile on a plane orthogonal to said articulation axes.

4. The module according to claim 1, wherein said at least one recess extends along a portion of said first surface that extends parallel to said at least one shaft by a length greater than the height of the respective said at least one roller.

5. The module according to claim 1, wherein said longitudinal axis of said at least one shaft is parallel to said articulation axes.

6. The module according to claim 1, wherein a plurality of said rollers adjacent to one another is mounted on said at least one shaft.

7. The module according to claim 1, wherein said at least one shaft includes at least two shafts and at least one respective said roller is mounted on each of the at least two shafts.

8. The module according to claim 7, wherein said first surface has at least two of said recesses, each for housing with clearance a portion of said at least one roller mounted on a respective shaft of said at least two shafts.

9. The module according to claim 8, wherein said at least two shafts are arranged symmetrically with respect to a median plane of said module.

10. The module according to claim 1, wherein said base body comprises a second surface opposite said first surface and defining a lower surface of said belt and at which the access end of at least one coupling space is defined, said coupling space being obtained in said base body for coupling with at least one tooth of a driving gear of said belt.

11. The module according to claim 9, wherein said base body comprises a second surface opposite said first surface and defining a lower surface of said belt and at which the access end of at least one coupling space is defined, said coupling space being obtained in said base body for coupling with at least one tooth of a driving gear of said belt, and said at least two shafts are arranged symmetrically with respect to a median plane of said coupling space.

12. The module according to claim 10, wherein said coupling space is obtained in a central position with respect to the articulation axes of said cylindrical hinges defined at said first end and at said second end of said base body and has a bottom defined by a wall of said base body.

13. The module according to claim 1, wherein said supports comprise a pair of edge walls that are defined at the opposite sides of said base body and that extend from said first surface.

14. The module according to claim 1, wherein each of said first end and of said second end comprises a plurality of respective said articulation eyes spaced from one another to define empty spaces in order to receive articulation eyes of said adjacent modules.

15. The module according to claim 1, wherein each of said articulation eyes is formed by a half-cylindrical portion having curvature radius, said height of said eye being equal to double said radius.

16. The module according to claim 1, wherein said height is 10 mm and said radius of said at least one roller is 5.5 mm and wherein said distance is 9.5 mm.

17. A modular conveyor belt, comprising:
   a plurality of the modules according to claim 1 articulated to one another.

* * * * *